(12) United States Patent
Yamanouchi (10) Patent No.: US 6,339,198 B1
(45) Date of Patent: Jan. 15, 2002

(54) DRAG SETTING SCALE

(75) Inventor: Roy Yamanouchi, San Jose, CA (US)

(73) Assignee: Design Methods Inc., San Jose, CA (US)

( * ) Notice: Subject to any disclaimer, the term of this patent is extended or adjusted under 35 U.S.C. 154(b) by 0 days.

(21) Appl. No.: 09/521,310

(22) Filed: Mar. 9, 2000

(51) Int. Cl.[7] .................. G01G 19/56; G01G 19/00; G01L 1/26; A01K 87/00
(52) U.S. Cl. ................. 177/148; 177/245; 73/862.391 73/862.472; 43/25
(58) Field of Search ................. 177/148, 149, 177/245, 131; 73/862.391, 862.392, 862.393 862.453, 862.472; 43/25

(56) References Cited

U.S. PATENT DOCUMENTS

| | | | | | |
|---|---|---|---|---|---|
| 220,668 | A | * | 10/1879 | Sawyer | 73/862.391 |
| 558,426 | A | * | 4/1896 | Scott | 73/862.472 |
| 1,211,820 | A | * | 1/1917 | Burbank | 73/862.472 |
| 1,458,014 | A | * | 6/1923 | Wailes | 177/245 |
| 2,472,142 | A | * | 7/1949 | Boulin | 73/862.472 |
| 2,550,282 | A | * | 4/1951 | McAvoy | 177/245 |
| 2,591,724 | A | * | 4/1952 | Saxl | 73/862.472 |
| 2,994,622 | A | * | 8/1961 | Miller | 177/245 |
| 3,246,859 | A | * | 4/1966 | Martin | 73/862.393 |
| 5,088,223 | A | * | 2/1992 | Chu | 43/17 |
| 5,639,038 | A | * | 6/1997 | Hirose | 73/862.391 |
| 5,962,817 | A | * | 10/1999 | Rodriguez | 177/245 |

* cited by examiner

*Primary Examiner*—Randy W. Gibson
(74) *Attorney, Agent, or Firm*—Stallman & Pollock LLP (57) ABSTRACT

A drag setting scale includes a hand-held weighing instrument, a wheel that functions as a pulley and a connector that provides a mechanical connection between the weighing instrument and the pulley.

5 Claims, 7 Drawing Sheets

Manner of use

Fig 2 Detail of Wheel mounting on Spindle

Fig 3 Manner of use

Fig 4
perspective view
of Ramification
unilizing molded plastic

Fig 5

Fig 6a
front view
in use

Fig 6b
front view
storage

Fig 6c
side view
storage

Fig 7 Flowchart for digital electronic scale

DRAG SETTING SCALE

BACKGROUND OF THE INVENTION

1. Field of Invention

The present invention relates to tension measurement instruments and, in particular, to a scale for measuring the drag tension on, for example, a fishing reel.

2. Discussion of Prior Art

In the field of sport fishing, the quest for a proper drag setting is a continuing, yet unsatisfied goal. Drag setting is a practice currently performed without a standard gauge of measure and without a proper language for communication. This situation occurs because existing fishing scales are designed to weigh fish, not to set drag tension on a reel.

U.S. Pat. No. 960,535 Gilfillan, Jun. 7, 1910; U.S. Pat. No. 2,603,474, Mandolf, Jul. 15, 1952; and U.S. Pat. 4,660, 666; Reder, Apr. 28, 1987, disclose fishing scales that are equipped with hooks to attach an entity to be weighed. In the practical environment, however, fishermen prefer to keep their fishing line threaded through the "eyes" of their fishing rods with a lure tied at the end of the line. A rod and reel set maintained in this form is termed "rigged." To measure the drag on a rigged rod and reel using currently available systems, the hook would either have to be attached at the lure, or to a loop tied on the fishing line between the reel and the first eye of the rod. In the first method, setting the drag would require one person to hold the scale, while a second person holds the reel to monitor the drag release. While the second method can be performed by a single person by attaching the scale to the loop, this would require re-threading the line through the eyes of the rod and retying the lure each time that a drag measurement is performed. Both approaches are dreaded by the average fisherman.

Typically, drag tension is currently measured by 'feel' as the line is manually pulled from the reel. This technique prohibits an accurate standard of measurement and, more detrimentally, prevents a communicable language for sharing information among fishermen.

SUMMARY OF THE INVENTION

Accordingly, my invention provides a technique for attaching a drag setting measuring device on a segment of fishing line between the reel and first eye of a rod without breaking the line, tying a knot or otherwise damaging the line. My invention also provides a drag setting measurement in standard units, e.g. pounds, thus allowing fishermen to exchange knowledge in commonly recognized terms, thereby improving fishing results and fishing enjoyment. Using my invention, a single fisherman can measure the drag on a 'rigged' fishing rod and reel set.

In its general sense, the present invention provides a hand-held weighing instrument, a wheel that functions as a pulley and a connector that provides a mechanical connection between the weighing instrument and the wheel. The fishing line from the reel is looped around the wheel. Then, while holding the weighing instrument in one hand and the reel in the other, the fisherman extends the weighing instrument away from the reel to exert tension on the line, thereby causing the instrument to provide a drag setting measurement.

Further features and advantages of my invention will become apparent from the following detailed description and accompanying drawings which set forth illustrative embodiments in which the principles of the invention are utilized.

DESCRIPTION OF INVENTION

Figure 1A:
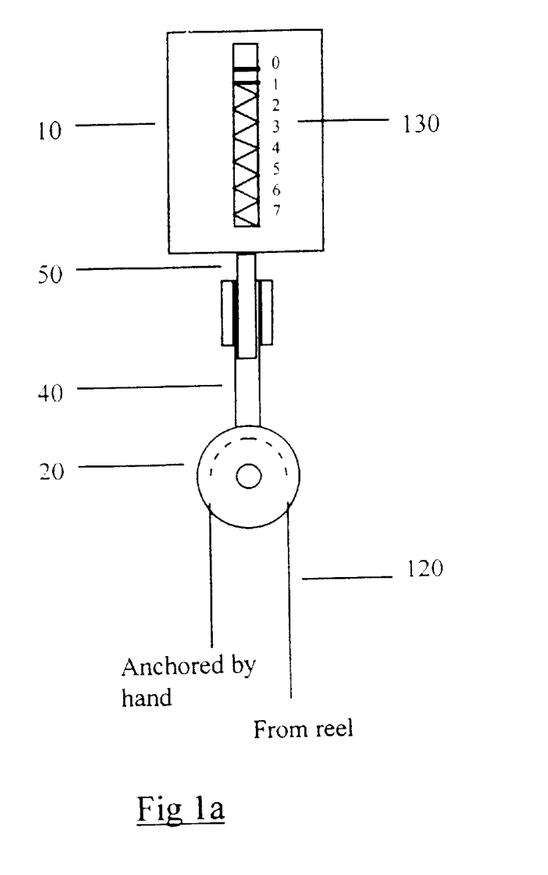
FIG. 1a is a front view illustrating a drag setting scale in accordance with the present invention.
Figure 1B:
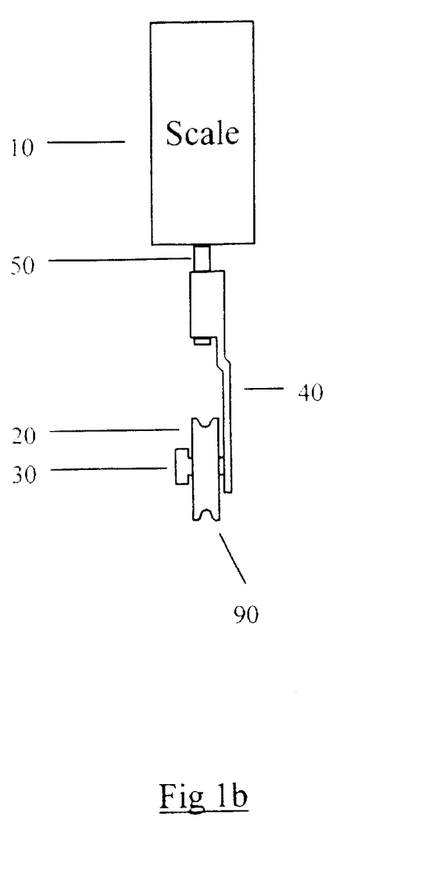
FIG. 1b is a side view illustrating a drag setting scale in accordance with the present invention.

A typical embodiment of a drag setting scale in accordance with the present invention is illustrated in FIG. 1a and FIG. 1b. The illustrated embodiment includes a hand held portable weighing scale 10, a wheel 20 applied as a pulley, a connector 40 for attaching the pulley 20 to the scale 10, and a spindle 30 for attaching the pulley 20 to the connector 40. Scale 10 is a conventional weighing scale contained in a hand-held housing. A rod 50 extrudes from the scale 10, forming a mechanical connection upon which to transfer the weight information to scale 10. Connector 40 is secured to rod 50 by rivets. In the illustrated embodiment, connector 40 is constructed of metal, forming a rigid connection between scale 10 and spindle 30.

Figure 2:
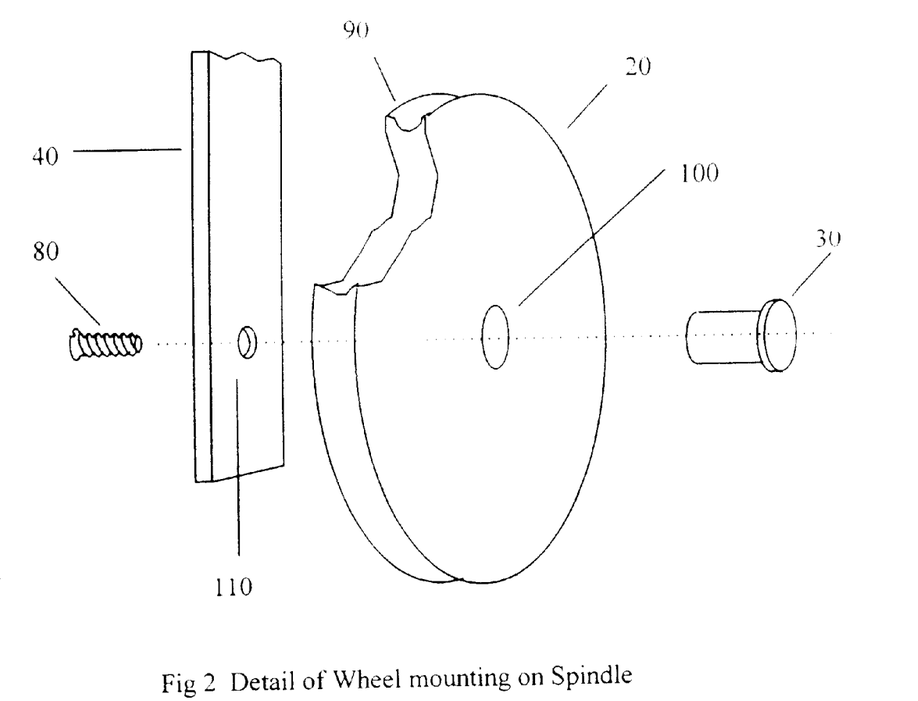
FIG. 2 is a detail of a wheel mounting on spindle utilizable in the drag setting scale shown in FIGS. 1a and 1b.

With reference to FIG. 2, the spindle 30 shown in FIGS. 1a and 1b is cylindrical, with one end flanged to act as a retainer of wheel 20. The opposite end of spindle 30 is drilled and threaded to receive a screw 80. The spindle hole 100 is slightly larger than the diameter of spindle 30 to permit free wheeling. The connector hole 110 is larger than the diameter of screw 80, but smaller than the outer diameter of spindle 30. The mounting of wheel 20 to connector 40 must be accomplished in a manner allowing access to wheel 20 by a fishing line to be looped about wheel 20, as discussed in greater detail below.

As shown in the FIG. 1b and FIG. 2, the perimeter edge surface 90 of the wheel 20 is concave. The concave surface 90 should be smooth, so as not to damage the fishing line. With reference to FIG. 1a, the path of the fishing line 120, extending downward from wheel 20, must not be obstructed by connector 40. With reference to FIGS. 1a and 1b, connector 40 is contoured to center wheel 20 with the axis of rod 50. Performance is optimal when centering is performed in both front (FIG. 1a) and side (FIG. 1b) views.

While scale 10 may be a mechanical, portable weighing instrument of the type in U.S. Pat. No. 960,535, by Gilfillan, June 1910 or U.S. Pat. No. 2,603,474, by Mandolf, July 1952, it may be replaced by any one of currently available manually held weighing instruments that provide an elongated member as a means of transferring force.

Figure 3:
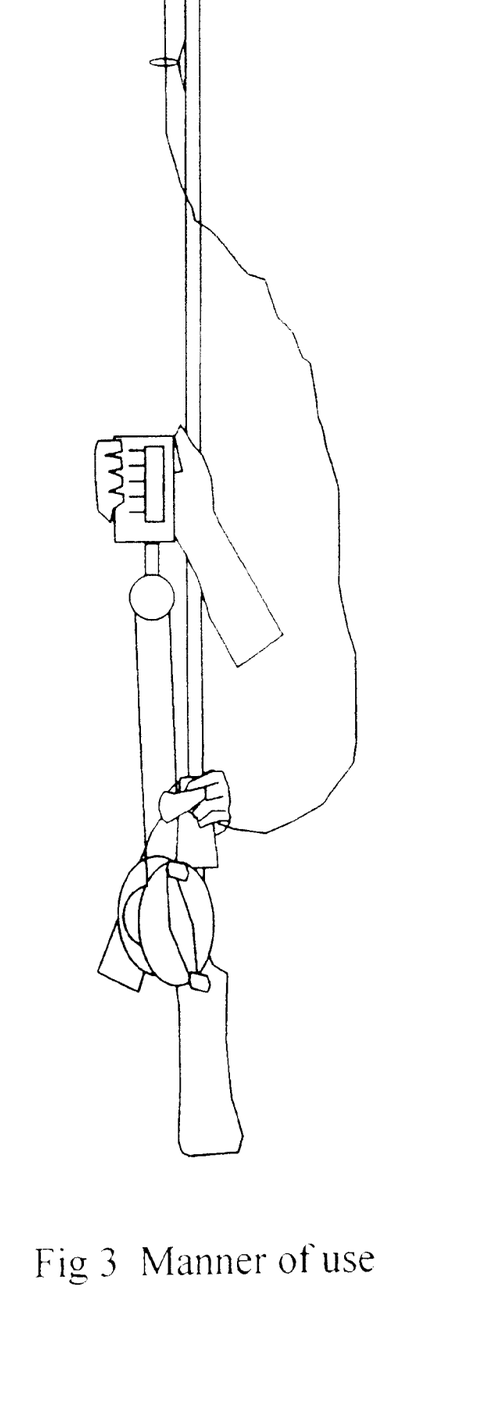
FIG. 3 illustrates a manner of using the drag setting scale shown in FIGS. 1a and 1b.

The manner of using my drag setting scale is as follows. Holding the fishing line (approximately 10 inches from the reel) in one hand and the drag scale in the other hand, loop the fishing line 120 over wheel 20 of the drag scale in a manner shown in FIG. 1a. Being careful to keep enough tension on the fishing line, such that it stays on the concave surface 90 of wheel 20, move the one hand (with fishing line still in grip) to the fore-grip of the rod, just ahead of the reel. Pulling the drag scale in a direction toward the rod tip, increasing tension until the drag slips. This is illustrated graphically in FIG. 3. The peak tension attained prior to the drag slip reflects the static friction of the drag. As soon as the drag slips, the tension will drop and the fishing line will roll off the spool. A sustained pull of the drag scale will result in a second and lower tension value, as the line continues to roll off the spool. The resulting tension reflects the dynamic friction of the drag.

The human mind is adept at recognizing the peak value and averaging the variances on analog scales. This factor allows the fisherman to quickly adapt to the analog drag scale.

An explanation of looping the fishing line 120 over the wheel 20 is detailed in the following text to clarify certain construction features of my invention. Since the rod and reel set is rigged, the end of the fishing line is not accessible between the reel and first eye of the rod. Further, it is easiest to engage the wheel 20 to the fishing line when the line is held straight. While I don't understand the human engineering aspects of why this is true, I have deduced this by performing the ritual. As shown in FIG. 1a, once engaged, the position of the fishing line 120 can be attained as described above.

With reference to FIG. 1a and FIG. 1b, the accessibility must be available to a plane bent at 90 degrees, with the vertex at the top of wheel 20, one leg of the plane extending in a forward direction away from the scale, the other leg extending in the downward direction, allowing a void in the plane where wheel 20 exists as well as its projection in the downward direction.

The mechanics that occur on my drag setting scale are explained below relative to the FIG. 1a illustration of the invention. As the fishing line 120 increases tension upon wheel 20, the wheel rotates to equalize the force of the fishing line 'from reel' and 'anchored by hand'. The sum of the forces 'from reel' and 'anchored by hand' is equal the force acting on the rod 50 of the scale 10. In order that the printed numerals 130 on the face of scale 10 reflect the correct tension of the fishing line, printed numerals 130 must reflect ½ the force on rod 50.

While the above Description of Invention details a basic embodiment, certain ramifications will now be cited below for possible cost, reliability and functionality advantages.

Figure 4:
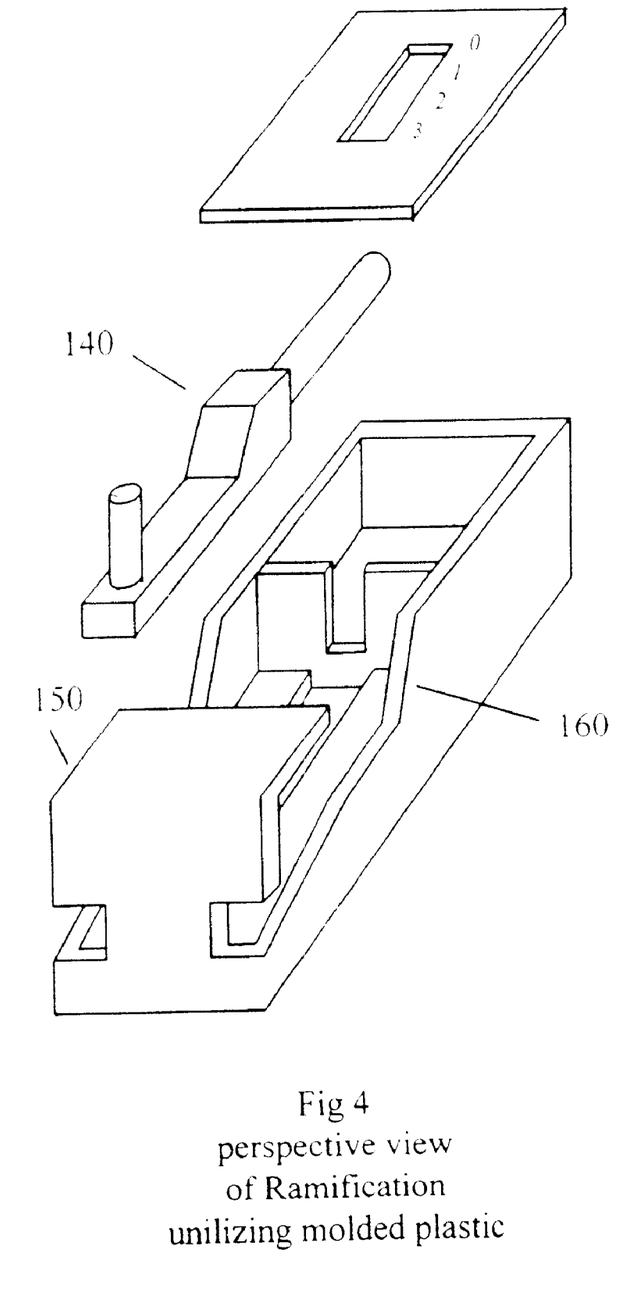
FIGS. 4a, 4b, 4c illustrate the ramifications of utilizing molded plastic in making a drag setting scale in accordance with the present invention.

FIG. 4 illustrates a molded component 140. This single component replaces rod 50, connector 40, spindle 30 and screw 80 in the FIG. 1a and FIG. 1b embodiment of the invention. Component 140 is plastic, thus enabling a cost advantage. FIG. 4 further illustrates an enclosure 150 encompassing wheel 20, thus reducing possibilities of breakage. FIG. 4 also illustrates a slanted side wall 160 that aids in guiding the fishing line to the wheel 20.

Figure 5:
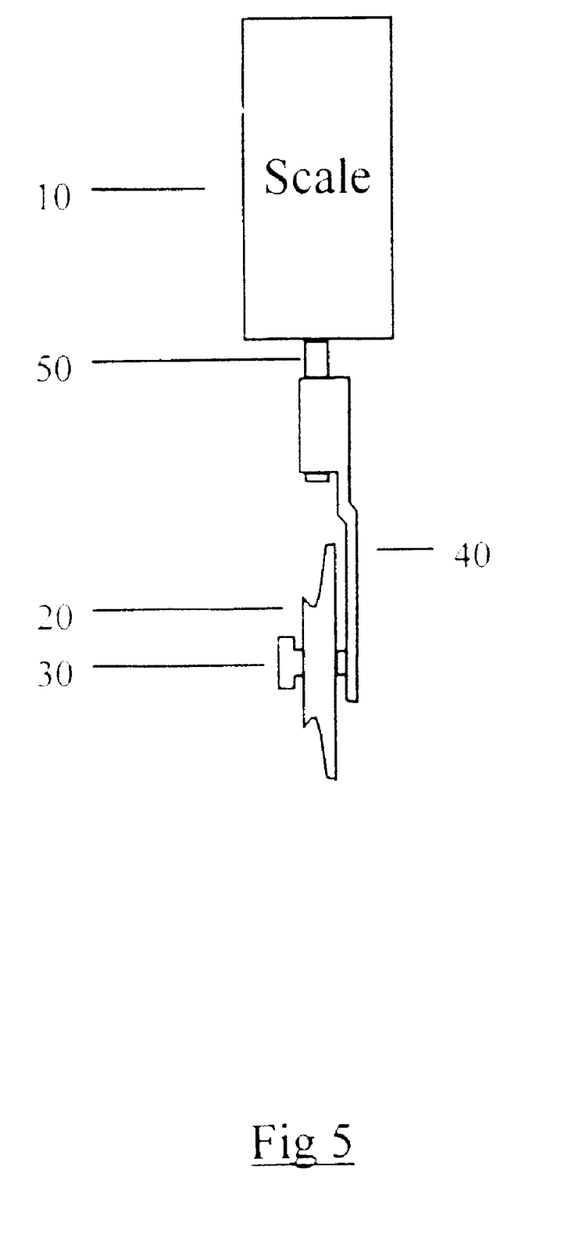
FIG. 5 shows modified wheel for use in a drag setting scale in accordance with the present invention.

In another embodiment, the wheel 20 can be modified to have a shape as shown in FIG. 5. This will be helpful to the user by shielding the line from getting behind wheel 20. The potential cost for a non-standard wheel posses a deterrent.

Figure 6A:
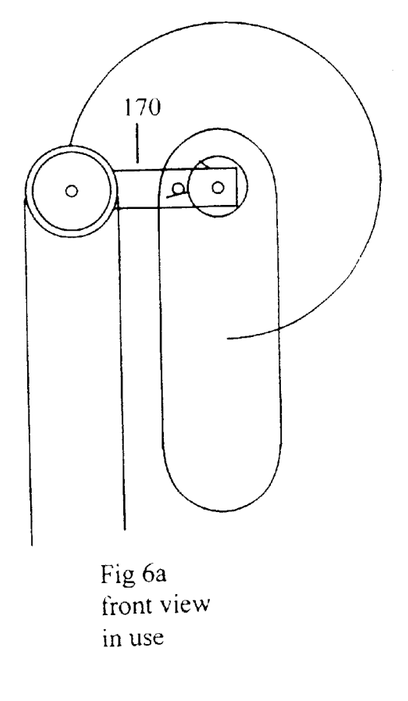
FIG. 6a shows a front in use view of a drag setting scale in accordance with the present invention.
Figure 6B:
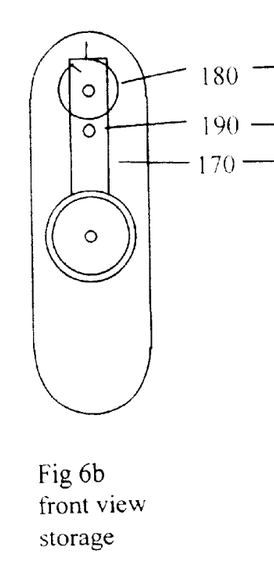
FIG. 6b shows a front storage view of a drag setting scale in accordance with the present invention.
Figure 6C:
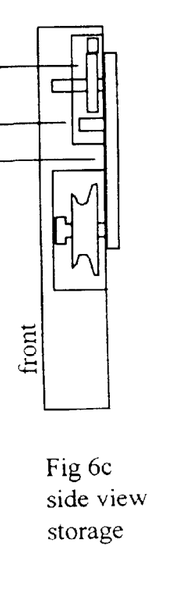
FIG. 6c shows a side storage view of a drag setting scale in accordance with the present invention.

An embodiment utilizing a rotational mechanical translation and a torque measurement is illustrated in FIGS. 6a–6c. The wheel 20 imparts a force which, when applied to a pivotal arm 170, becomes a torque working against a torsion spring 180. Pivotal arm 170 may be turned clockwise to bring the wheel 20 into a storage position, as shown in FIG. 6b. Moving pivotal arm 170 in the counter clockwise direction causes a pin 190 to engage the torsion spring 180. A graduated scale on the arc of the handle serves to indicate weight; a pivotal arm 170 serves as its pointer.

In yet another embodiment, scale 10 can be electronic and of the variety disclosed in U.S. Pat. No. 5,545,855 by Stanfield, Aug. 13, 1996, and U.S. Pat. No. 4,660,666 by Reder, Apr. 28, 1987. The nature of electronic scales are such that the digital display is difficult to read when the values vary rapidly. The nature of reading a reel drag creates a less than optimal situation for the digital display, because of the variations in tension during the operation of reading a drag, as explained in the previous section. There is, however, a characteristic of the electronic scale to offset the disadvantages of the digital display. The electronic scale, possessing a microcontroller, has the ability to follow an algorithm, store values and present them on the display at a later time.

Figure 7:
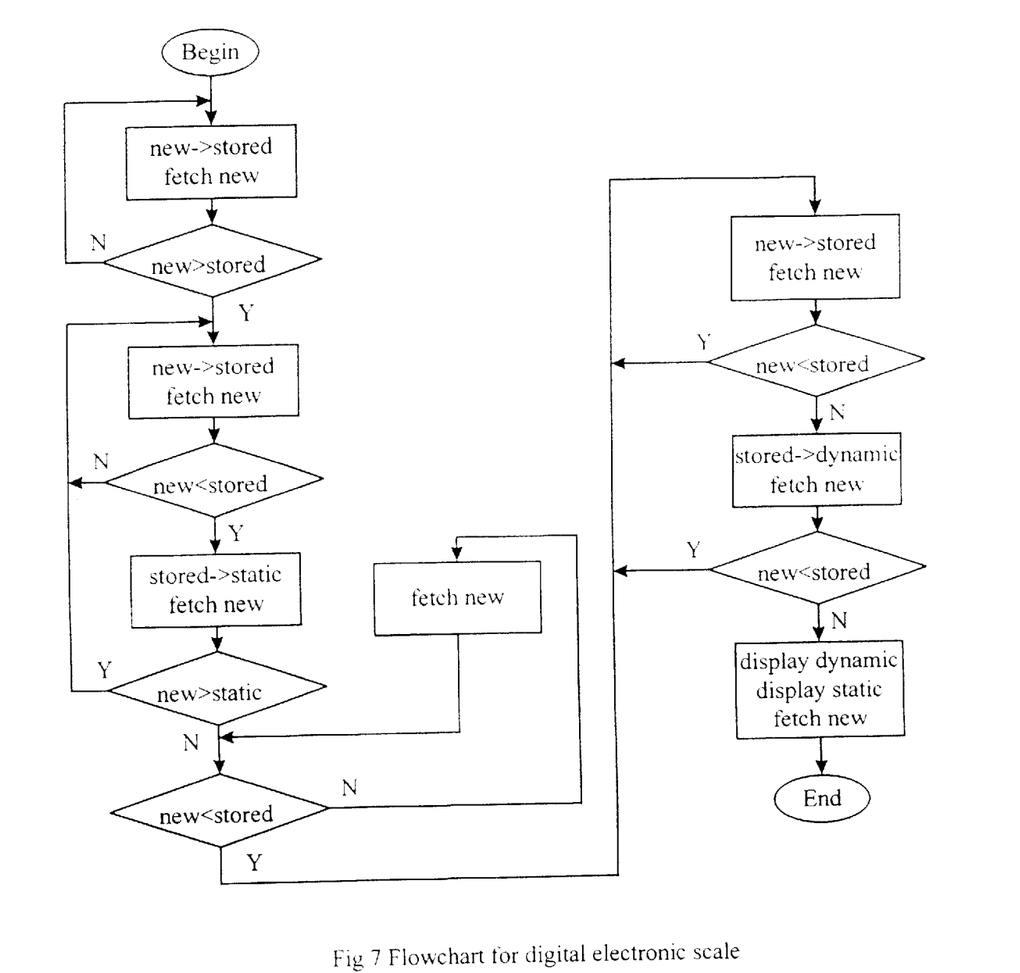
FIG. 7 provides a flow chart for a digital electronic scale in accordance with the present invention.

A flow chart of the process to accomplish this is shown in FIG. 7.

It should be understood that various alternatives to the embodiments of the invention described above may be employed in practicing the invention. It is intended that the following claims define the scope of the invention and that methods and structures within the scope of these claims and their equivalents be covered thereby.

What is claimed is:

1. A hand-held apparatus that measures drag tension of a fishing line disposed on a rigged fishing rod and reel set, the fishing line being wound on the reel and having an end that extends from the reel through a sequence of a plurality of spaced-apart eyes formed on the fishing rod, the apparatus comprising:

a drag tension measuring instrument that includes an indicator that is calibrated to indicate drag tension applied to the drag tension measuring instrument and an extrusion member connected to the indicator; and a pulley-wheel member rotatably attached to the extrusion member and adapted to receive the fishing line between the reel and an eye of the fishing rod such that drag tension of the fishing line is transferred from the pulley-wheel member to the indicator by the extrusion member.

2. A hand-held apparatus that measures drag tension of a fishing line disposed on a rigged fishing rod and reel set, the fishing line being wound on the reel and having an end that extends from the reel through a sequence of a plurality of spaced-apart eyes formed on the fishing rod, the apparatus comprising:

a weighing scale contained in a hand-held housing;

a rod extruding from the weighing scale and forming a mechanical connection therewith to transfer weight information to the weighing scale;

a connector secured to the rod; and a pulley-wheel rotatably attached to the connector and adapted to receive the fishing line between the reel and an eye of the fishing rod such that drag tension of the fishing line is transferred from the pulley-wheel to the weighing scale by the rod and the connector.

3. A hand-held apparatus as in claim 2, and wherein the connector is contoured to center a rotational axis of the pulley-wheel with a longitudinal axis of the rod.

4. A hand-held apparatus as in claim 2, and wherein the perimeter surface of the pulley-wheel is concave.

5. A method of using a hand-held apparatus to measure drag tension of a fishing line disposed on a rigged fishing rod and reel set, the fishing line being wound on the reel and having an end that extends from the reel through a sequence of a plurality of spaced-apart eyes formed on the fishing rod, and wherein the apparatus includes a drag tension measuring instrument having an extrusion member connected thereto and a pulley-wheel member rotatably attached to the extrusion member and adapted to receive the fishing line such that drag tension of the fishing line is transferred from the pulley-wheel member to the drag tension measuring instrument via the extrusion member, the method comprising:

grasping the fishing line in one hand and the drag tension measuring instrument in the other hand;

looping the fishing line over the wheel at a point on the fishing line between the reel and an eye of the fishing rod;

pulling the drag tension measuring instrument toward a tip of the fishing rod, thereby increasing tension until the drag slips; and sustaining the pulling of the drag tension measuring instrument until the drag tension of the fishing line registers as a value on the drag tension measuring instrument.

\* \* \* \* \*

UNITED STATES PATENT AND TRADEMARK OFFICE
CERTIFICATE OF CORRECTION

PATENT NO.    : 6,339,198 B1
DATED         : January 15, 2002
INVENTOR(S)   : Roy Yamanouchi It is certified that error appears in the above-identified patent and that said Letters Patent is hereby corrected as shown below:

<u>Column 4,</u>
Line 47, before "pulley-wheel" insert -- single --;
Line 65, before "pulley-wheel" insert -- single --; and <u>Column 5,</u>
Line 15, before "pulley-wheel" insert -- single --.

Signed and Sealed this

Thirteenth Day of August, 2002

*Attest:*

JAMES E. ROGAN
*Attesting Officer*     *Director of the United States Patent and Trademark Office*